June 2, 1970     T. ZIAYLEK, JR     3,515,367

HOSE CLAMP

Filed Sept. 13, 1967     2 Sheets-Sheet 1

INVENTOR
THEODORE ZIAYLEK JR.
BY *Sperry and Zoda*
ATTORNEYS

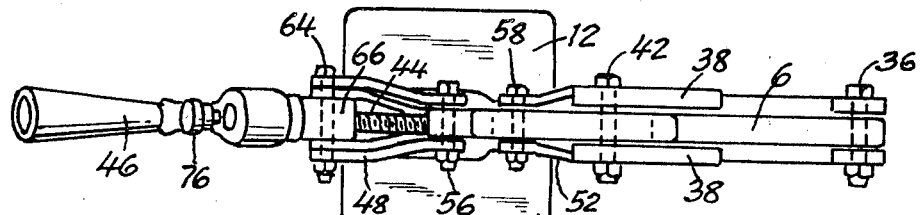
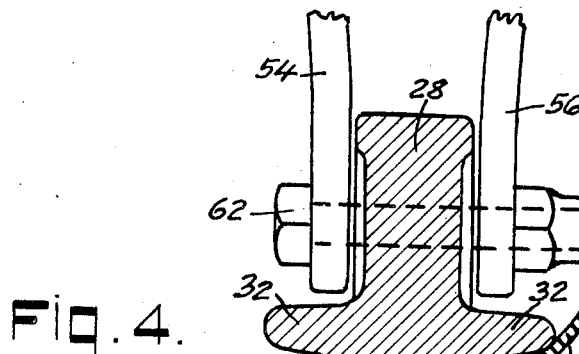
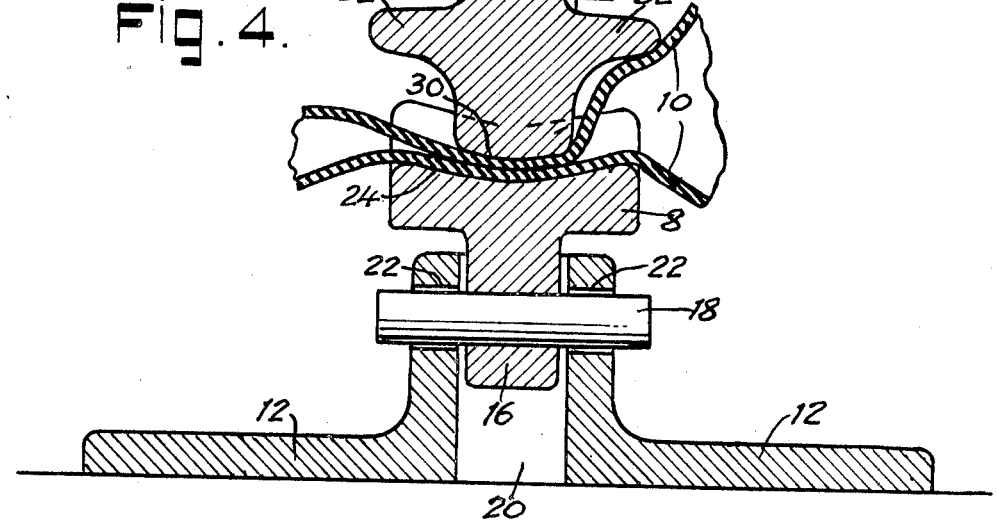
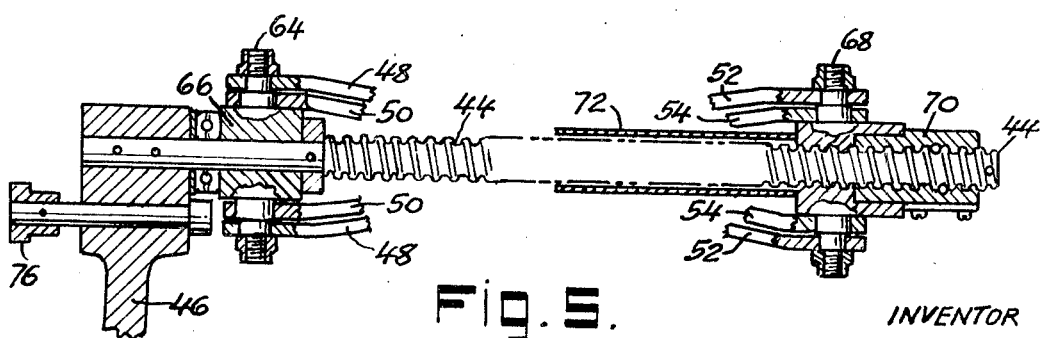

3,515,367
HOSE CLAMP
Theodore Ziaylek, Jr., 140 Riverview Ave.,
Yardley, Pa. 19067
Filed Sept. 13, 1967, Ser. No. 667,439
Int. Cl. F16k 7/06
U.S. Cl. 251—9                                5 Claims

ABSTRACT OF THE DISCLOSURE

A hose clamp adapted for use in controlling the flow of high pressure fluid through a flexible hose such as a fire hose. The device embodies an anvil for receiving the hose to be controlled and a pressure member movable toward and away from the anvil by means of screw actuated lever mechanism which preferably includes a pair of toggle members.

FIELD OF INVENTION

This invention relates to clamping devices for use in controlling the flow of high pressure fluid through a flexible hose and is particularly directed to portable equipment for manually controlling the flow of water through a fire hose.

PRIOR ART

Clamps heretofore provided for use on fire hose and other high pressure large diameter flexible hoses have generally embodied various types of manually operated levers which are movable to either of two extreme positions wherein the hose is either fully clamped to cut off all flow through the hose or is fully released to permit full flow through the hose.

Such hose clamps are difficult and even dangerous to operate since the operating lever by which they are manipulated requires considerable force to move it to a hose clamping position and if the handle should slip or be suddenly released it may fly back and strike the person using the device. Moreover, the sudden surges of pressure which occur when the clamp is released render it almost impossible to control a hose nozzle attached to the hose.

SUMMARY OF THE INVENTION

In accordance with the present invention a portable hose clamp for use on fire hose and the like is provided with an anvil on which the hose may be placed, a pressure member movable toward and away from the anvil to control the flow of fluid through the hose, a frame member on which the pressure member is pivotally mounted, and screw actuated means for moving the pressure member with respect to the anvil to control the flow of fluid through the hose.

In the preferred embodiment of the invention toggle members connected to the frame and pressure member are actuated by a threaded member to apply a powerful but continuously controlled force to the pressure member to move it toward and away from the anvil on which the hose is positioned.

The drawings:

FIG. 3 is a top plan view of the construction shown in FIGS. 1 and 2;

FIG. 4 is a vertical sectional view of the anvil and pressure member with a hose clamped therebetween, and FIG. 5 is a longitudinal sectional view of the construction shown in FIG. 1 taken on the line 5—5 thereof.

PREFERRED EMBODIMENT OF INVENTION

Figure 1:
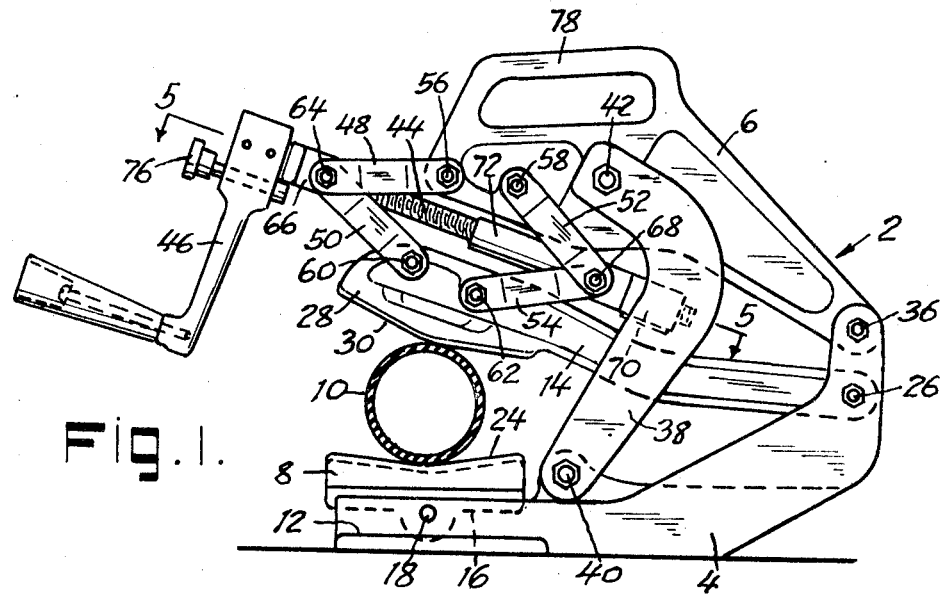
FIG. 1 is a side elevation of one preferred form of hose clamp embodying the present invention with a hose positioned on the anvil preparatory to clamping thereof.

In that form of the invention chosen for purposes of illustration in the drawings, the hose clamp is particularly designed for use in controlling the flow of water through a fire hose. For this purpose the equipment embodies a generally C-shaped frame 2 having a base portion 4 and a body portion 6. An anvil 8 is mounted on the base portion 4 of the frame adjacent the open side thereof in position to receive the hose 10 to be clamped. A supporting foot or platform 12 is carried by the base 4 and located below the anvil 8 in position to rest upon the ground or other surface to provide a firm support for the clamp and its anvil. The platform 12 projects outward from the base portion 4 on opposite sides thereof and below the hose 10 so as to prevent transverse tilting of the hose clamp during use thereof.

The anvil 8 preferably is tiltable to a limited extent with respect to the base portion 4 of the body to permit the hose and anvil to adjust their positions with respect to each other and with respect to the pressure member 14 which is movable toward and away from the anvil in controlling the flow of fluid through the hose. For this purpose the anvil is provided with a central downwardly extending web 16 through which a pivot pin 18 is passed. The base portion 4 of the frame is slotted at 20 to receive the web 16 of the anvil 8 and the opposite ends of the pivot pin 18 are received in openings 22 in the base portion 4 at opposite sides of the slot 20.

The upper surface 24 of the anvil 8 is preferably shaped so as to be somewhat concave in directions both longitudinally and transversely of the anvil as shown in FIGS. 1 and 4 so as to aid in supporting the hose and conforming thereto when the hose is subjected to the clamping action of the pressure member 14.

The pressure member 14 is preferably in the form of a lever element pivotally connected near one end thereof to the frame 2 at the point 26 and extends therefrom over the base portion 4. The pressure member has a pressure head 28 near the opposite end thereof which is provided with a downwardly facing surface 30 that is generally shaped to conform and cooperate with the upwardly facing surface 24 of the anvil 8. However, the pressure head 28 may also be provided with laterally projecting wings or webs 32 as shown in FIG. 4 which are located above the surface 30 and positioned to be engaged by the expanded portion of the hose 10 when the hose is clamped. In this way the head 28 of the pressure head serves to reduce the angle at which the fabric of the hose is deflected on the pressure side thereof when the flow of fluid through the hose is reduced or cut off. The danger of injury or rupture of the hose is thus reduced. Moreover, the tendency for the expanded portion of the hose to exert a tilting action on the hose clamp is also reduced whereby the clamp is held in a stable position on the surface upon which it is mounted.

The body portion 6 of the frame 2 may be formed integral with the base portion 4 thereof. However, as shown in the drawings the body portion may be made as a separate element and secured to the base portion 4 by means of a bolt 36. This construction is preferred for the reason that it serves to permit the body and base to adjust their relative positions somewhat upon the application of clamping forces thereto. When the body 6 and base portion 4 are thus joined connecting members 38 are secured to the base 4 by means of a bolt 40 and are secured to the body 6 at its upper end by means of a bolt 42. The use of connecting means of this type further aids in distributing the forces applied to the base, body and bolts or connecting means more uniformly.

The pressure member 14 is movable about its pivot point 26 to move the pressure head 28 thereof toward and away from the hose supporting anvil 8. In order to apply the necessary force to the pressure head to clamp a fire hose under 200 to 300 pounds per square inch pressure, or more, while at the same time controlling the clamping action, screw actuated lever members or links are preferably employed.

As shown two opposed toggle elements are connected at their opposite ends to the head 2 and the pressure member 14 and are actuated by a screw threaded shaft 44 to which a hand crank 46 or other operating means is connected. A front toggle element consisting of the pair of links 48 and 50 is provided and a near or opposed pair of links 52 and 54 may be used. The upper ends of the upper links 48 and 52 of each pair are pivotally connected to the body 6 of the frame at the spaced points 56 and 58. In a similar way the lower ends of the lower toggle links 50 and 54 are connected to the pressure member 14 at the points 60 and 62 near the pressure head 28 of the pressure member. The front links 48 and 50 are pivotally connected to each other at the opposite or inner ends thereof by means of bolts 64 which are carried by a thrust member 66 whereas the opposite or inner ends of the opposed toggle links 52 and 54 are pivotally connected together by means of bolts 68 mounted on the thread engaging element 70.

Figure 2:
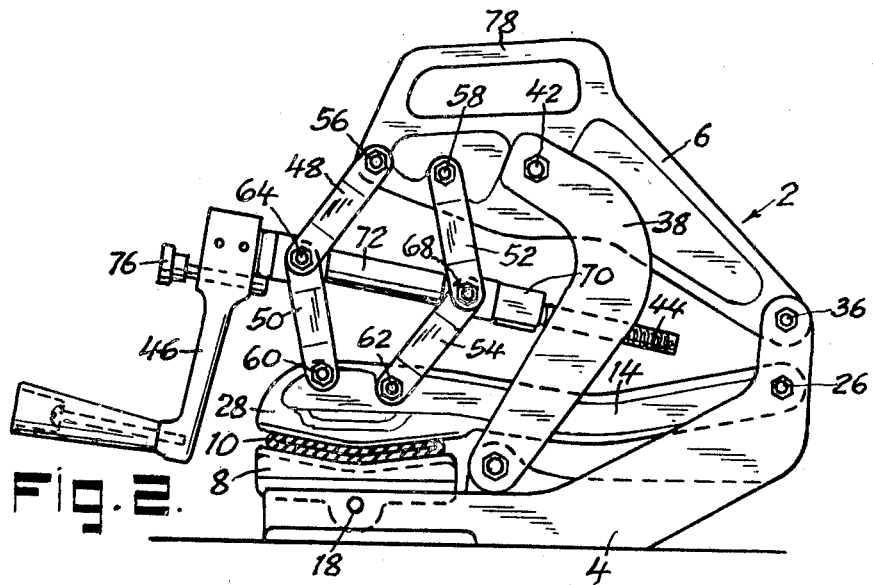
FIG. 2 is a view similar to FIG. 1 illustrating the position of the elements when the hose is fully clamped.

With this construction the elements may be moved to their open and hose receiving positions as illustrated in FIG. 1 so that the hose to be clamped and controlled may be readily placed on the anvil 8. Thereafter, in order to cut off the flow of fluid through the hose the shaft 44 may be rotated by the hand crank 46 to move the elements to the hose clamping position of FIG. 2. During such movement the rotation of the threaded shaft 44 serves to move the thread engaging element 70 and the inner ends of the links 52 and 54 lengthwise of the shaft 44 and toward the thrust member 66. As a result the inner pivotal connections of the pairs of toggle links are moved toward each other toward the positions shown in FIG. 2. The movement of the toggle links from the angularly disposed positions of FIG. 1 to the more nearly aligned positions of FIG. 2 serves to move the pressure member 14 about its pivotal connection on the frame 2 whereby the pressure head 28 is urged toward the anvil 8 to compress and clamp the hose to reduce or cut off the flow of fluid through the hose.

During such pivotal movement of the pressure member and change in the angular relation of the toggle links the upper ends of the toggle links will, of course, exert an upward thrust against the body 6 of the frame. However, such thrust is opposed by the connecting members 38 which serve to hold the body 6 in a substantially fixed position on the frame 2. As a result the forces exerted on the pressure head by rotation of the threaded shaft 44 and the change in angular relation of the toggle links are multiplied and utilized in moving the pressure head 28 toward and anvil 8. The power required to rotate the handle 46 is therefore very limited whereas the force applied to clamp the hose is correspondingly great. Therefore the hose clamp can be actuated manually and very easily and quickly without any danger whatever to the person operating the device. Moreover, the clamping and release of the hose takes place relatively gradually so that surging of pressure in the hose does not occur.

In order to prevent the application of excessive or further clamping forces on the hose after it has been effectively clamped between the pressure head and anvil, a stop member, such as the sleeve 72 on the shaft 44, may be employed. The length of the sleeve 72 is such that when the parts have been moved to a suitable hose clamping position the opposite ends of the sleeve 72 will be in engagement with the thrust member 66 and the thread engaging element 70 preventing continued movement thereof by the shaft 44 and crank 46.

In practice it has been found advantageous to employ a ball bearing screw device, such as that known as a "Raceway" and produced by Saginaw Corporation, as the thread engaging element 70. In this way the energy required to rotate the threaded shaft 44 is materially reduced and rotation of the crank 46 is rendered very easy even when the hose pressure is extremely high—exceeding 300 pounds per square inch. Further, in order to hold the pressure member in any desired clamped or partially clamped position, and in order to prevent the pressure member from backing off under excessive or changing pressure within the hose, it is preferable to provide a holding means for preventing undesired rotation of the crank 46, and shaft 44. For this purpose a stop pin 76 is mounted on the crank 46 and is movable into and out of a position to engage the squared side or other portion of the thrust member 66, to prevent rotation of the crank.

The hose clamping device thus provided may be made of aluminum castings or any other suitable material so as to be relatively light in weight and easy to handle. It is also desirable to provide the device with a suitable carrying handle such as the handle 78 on the body 6 of the frame 2. This handle preferably also is located in such a position as to permit quick and easy placement of the hose clamp in position to receive a hose whereby delays in its placement and use during the confusion of an actual fire are eliminated.

While the hose clamp shown and described has proven very successful in use, it will, of course, be understood that numerous changes and modifications may be made in the form, construction and arrangements of the parts thereof. It should therefore be understood that the particular embodiment of the invention shown in the drawings and described above is intended to be illustrative only and is not intended to limit the scope of the invention.

I claim:

1. A hose clamp comprising a base having a hose receiving anvil thereon, a body member connected to said base, a pressure member located between said base and body member, said pressure member having a pivotal connection to said base near one end thereof and provided at its opposite end with a pressure head movable about said pivotal connection toward and away from said anvil, a threaded shaft, and lever means including a pair of toggle links connected to said body member and said pressure member and movable in response to rotation of said shaft for moving the pressure head of said pressure member toward and away from said anvil.

2. A hose clamp as defined in claim 1 wherein said pressure head has a hose clamping surface and presents a laterally projecting portion spaced from the hose clamping surface and positioned to engage the expanded pressure side of the hose, when clamped, at a point spaced from the clamped portion of the hose so as to limit the angle at which the wall of the hose is deflected upon clamping of the hose.

3. A hose clamp as defined in claim 1 wherein said lever means includes two pairs of opposed and oppositely movable toggle links.

4. A hose clamp as defined in claim 3 wherein one pair of said toggle links is connected to and movable with a thrust member surrounding said threaded shaft and the other pair of said toggle links is connected to and movable with a thread engaging member on said threaded shaft.

5. A hose clamp as defined in claim 4 wherein a tubular sleeve surrounds said threaded shaft and is located between said thrust member and said thread engaging member to limit the movement thereof toward each other upon clamping of a hose between said pressure head and anvil.

References Cited

UNITED STATES PATENTS

| | | | |
|---|---|---|---|
| 9,824 | 6/1853 | Semple | 100—287 |
| 628,391 | 7/1899 | Clarke | 251—9 |
| 1,701,411 | 2/1929 | Kellam | 251—9 |
| 2,010,229 | 8/1935 | Goff et al. | 251—6 |
| 2,680,000 | 6/1954 | Pulver | 251—8 |
| 2,390,022 | 11/1945 | Wood | 269—240 X |

WILLIAM F. O'DEA, Primary Examiner

R. GERARD, Assistant Examiner

U.S. Cl. X.R.

100—287; 269—240